United States Patent
Ono (10) Patent No.: US 12,243,400 B2
(45) Date of Patent: Mar. 4, 2025

(54) MERCHANDISE SALES DEVICE (71) Applicant: TOSHIBA TEC KABUSHIKI KAISHA, Tokyo (JP)

(72) Inventor: Yasuhiro Ono, Yokohama Kanagawa (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 18/739,359

(22) Filed: Jun. 11, 2024

(65) Prior Publication Data
US 2025/0029459 A1 Jan. 23, 2025

(30) Foreign Application Priority Data
Jul. 19, 2023 (JP) ................................ 2023-117798

(51) Int. Cl.
G07G 1/00 (2006.01)
(52) U.S. Cl.
CPC .................. *G07G 1/0018* (2013.01)
(58) Field of Classification Search
CPC .................................................. G07G 1/0018

USPC ......................................................... 235/383
See application file for complete search history.

(56) References Cited

U.S. PATENT DOCUMENTS

| | | | |
|---|---|---|---|
| 5,249,103 A * | 9/1993 | Forsythe | A47B 21/0314 361/679.41 |
| 7,011,246 B2 | 3/2006 | Nanbu et al. | |
| 2003/0132918 A1* | 7/2003 | Fitch | G06Q 20/40145 345/173 |
| 2021/0182820 A1* | 6/2021 | Nieuwborg | G06K 7/1417 |

FOREIGN PATENT DOCUMENTS

JP 2-259990 10/1990

* cited by examiner

*Primary Examiner* — Daniel A Hess
(74) *Attorney, Agent, or Firm* — Amin, Turocy & Watson, LLP (57) ABSTRACT

According to one embodiment, a merchandise sales device includes a main body device and a support member. The main body device performs information processing for merchandise sales while accepting an operation from an operator. The support member can selectively form a first state where the main body device can be placed at a horizontal surface while a predetermined attitude of the main body device is maintained, and a second state where the main body device can be fixed to a vertical surface.

16 Claims, 11 Drawing Sheets

MERCHANDISE SALES DEVICE

CROSS-REFERENCE TO RELATED APPLICATION

This application is based upon and claims the benefit of priority from Japanese Patent Application No. 2023-117798, filed on Jul. 19, 2023, the entire contents of which are incorporated herein by reference.

FIELD

Embodiments described herein relate generally to a merchandise sales device and a support member.

BACKGROUND

As various merchandise sales devices that perform information processing for merchandise sales, such as a POS (point-of-sale) terminal device, there are a plurality of types configured to adapt to different use patterns, respectively. To introduce a merchandise sales device in a store, a merchandise sales device configured to adapt to the store environment is selected from among the plurality of types.

In view of such circumstances, it is desired that the use pattern of the merchandise sales device can be changed in accordance with various store environments.

DETAILED DESCRIPTION

An embodiment described herein is to provide a merchandise sales device the use pattern of which can be changed in accordance with various store environments, and a support member therefor.

In general, according to one embodiment, a merchandise sales device includes a main body device and a support member. The main body device performs information processing for merchandise sales while accepting an operation from an operator. The support member can selectively form a first state where the main body device can be placed at a horizontal surface while a predetermined attitude of the main body device is maintained, and a second state where the main body device can be fixed to a vertical surface.

Some embodiments will now be described, using the drawings.

First Embodiment

Figure 1:
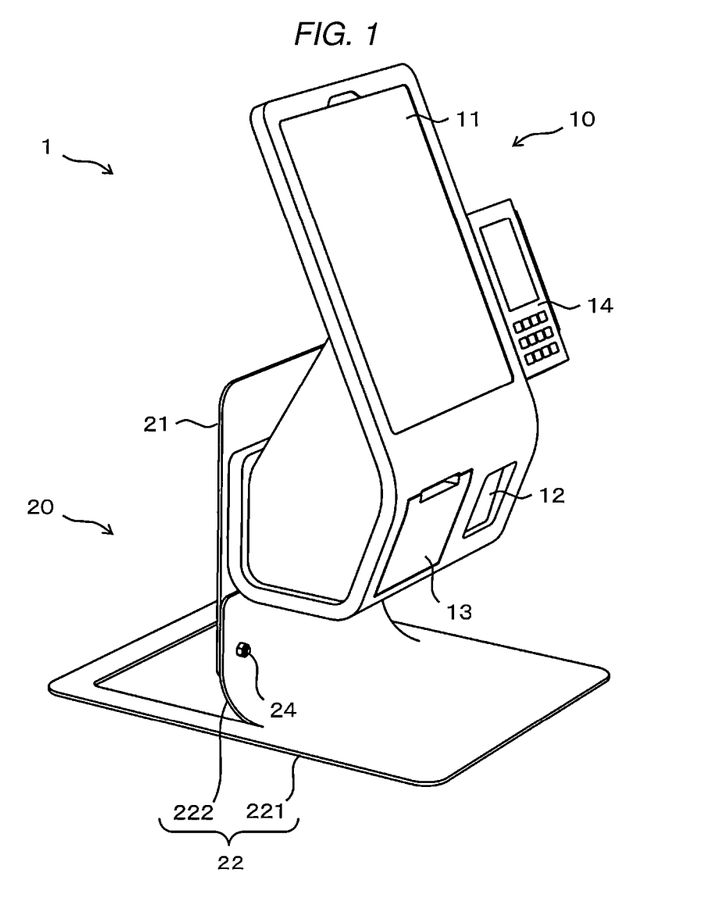
FIG. 1 is a perspective view showing a configuration in a first use pattern of a POS terminal device according to a first embodiment.

FIG. 1 is a perspective view showing a configuration in a first use pattern of a POS terminal device 1 according to a first embodiment.

Figure 2:
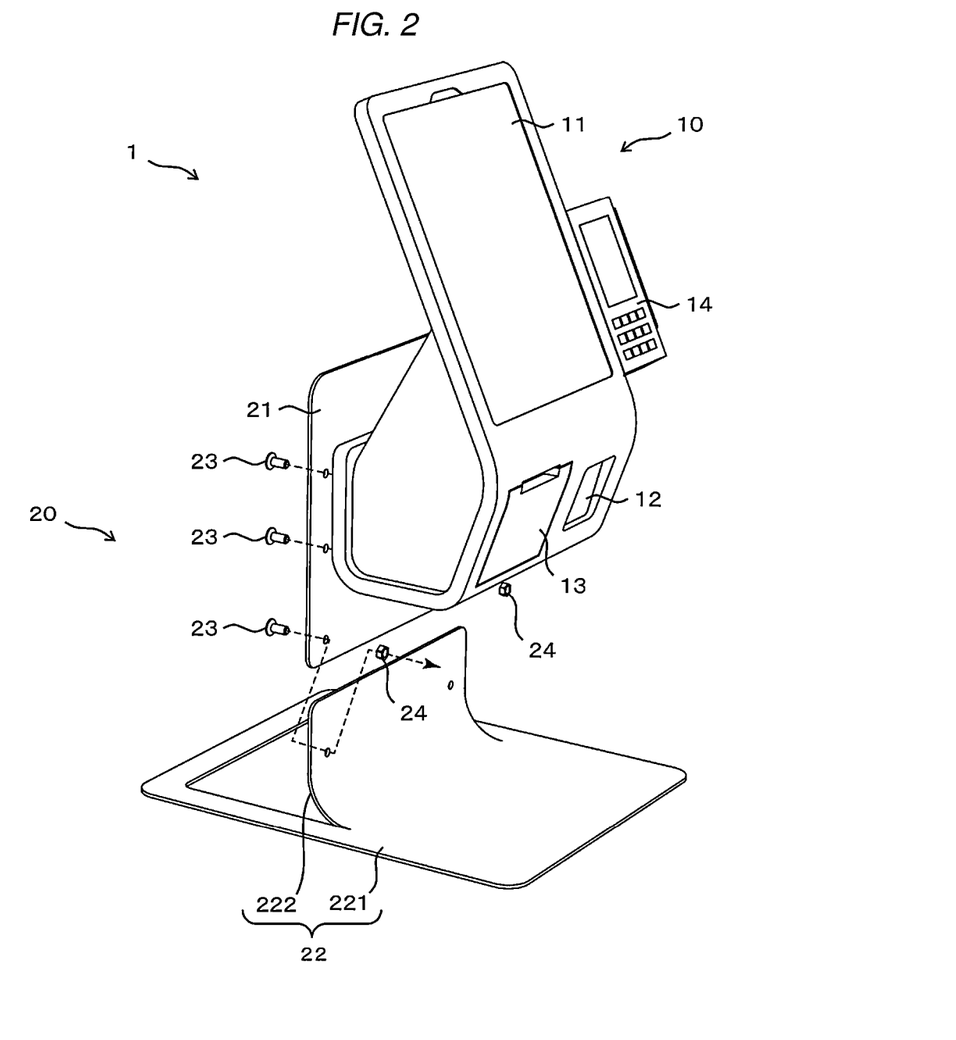
FIG. 2 is an exploded perspective view of the POS terminal device.

FIG. 2 is an exploded perspective view of the POS terminal device 1 shown in FIG. 1.

The POS terminal device 1 performs information processing for the registration of a merchandise item as a merchandise item to be sold (hereinafter referred to as registration processing) in response to an operation by an operator. The POS terminal device 1 performs information processing for the payment of the price of a merchandise item registered as a merchandise item to be sold (hereinafter referred to as payment processing) in response to an operation by the operator. That is, the POS terminal device 1 is an example of a merchandise sales device that performs information processing such as the registration processing and the payment processing related to merchandise sales. The payment processing includes calculation processing for the calculation of the price and settlement processing for the settlement of the price.

The POS terminal device 1 includes a main body device 10 and a support member 20.

The main body device 10 includes various devices to perform the information processing related to merchandise sales.

In FIGS. 1 and 2, a touch panel 11, a scanner 12, a receipt printer 13, and a settlement unit 14, which are devices exposed outside a casing, are shown. The touch panel 11, the scanner 12, the receipt printer 13, and the settlement unit 14 are provided at one same surface (hereinafter referred to as an operation surface) of the casing. The main body device 10 contains other devices such as a computer and a communication unit inside the casing.

The touch panel 11 displays various screens to show various information to the operator. The touch panel 11 inputs an instruction from the operator in response to a touch operation on the screen by the operator.

The scanner 12 optically scans a barcode or a two-dimensional code or the like held in front of the scanner 12.

The receipt printer 13 prints and outputs a receipt showing the content of a transaction including a list of merchandise items defined as merchandise items to be sold and the result of payment or the like, after the completion of the payment.

The settlement unit 14 reads data recorded on a settlement card such as a credit card, a prepaid card, or an electronic money card. The settlement unit 14 also writes data onto the settlement card. The settlement unit 14 has reading devices corresponding to IC reading, magnetic reading, and proximity communication reading of a credit card, respectively. The reading device for IC reading reads data stored in an IC (integrated circuit) provided on a credit card by communication via an electrical contact. The reading device for magnetic reading reads data magnetically recorded on a magnetic stripe formed on a surface of a credit card, using a magnetic head. The reading device for proximity communication reading reads data stored in an IC provided on a credit card by wireless communication such as NFC (near-field communication). However, the settlement unit 14 need not necessarily have all these functions. The settlement unit 14 may have a keyboard and input an instruction from an operator based on an operation on the keyboard.

The shape of the casing of the main body device 10 shown in FIG. 1 is an example and may be other suitable shapes. However, it is preferable that the width in the direction of depth in the case where the device is used with the operation surface facing the front is small so that the device is suitable for the use in a wall-hanging state, described later. In view of such circumstances, the width in a first direction, which is the direction of depth, of the casing of the main body device 10 shown in FIG. 1, is smaller than the width in a second direction orthogonal to the first direction. Therefore, the main body device 10 tends to easily tilt in the direction of depth due to an operation on the touch panel 11 and the settlement unit 14.

The support member 20 is formed of a first member 21 and a second member 22. The first member 21 is in the shape of a thin plate using a material such as a metal having such a rigidity that the first member 21 is not easily deformed. The first member 21 is fixed to the surface opposite to the operation surface of the casing of the main body device 10 by a plurality of bolts 23. A part of the first member 21 protrudes below the bottom surface of the casing of the main body device 10.

The second member 22 has a pedestal part 221 and an attachment part 222. In the second member 22, a part of one rectangular thin plate is cut and bent to form the attachment part 222. For the second member 22, a material such as a metal having such a rigidity that the second member 22 is not easily deformed from this state is used. The pedestal part 221 extends on both sides of a proximal part of the attachment part 222 as the attachment part 222 is bent at such a position that the proximal part of the attachment part 222 is located near the center of the thin plate. It is preferable that the width of the pedestal part 221 in the direction of extension is larger than the width of the bottom surface of the main body device 10. The angle formed by the pedestal part 221 and the distal end of the attachment part 222 may preferably be approximately 90 degrees but may be any angle.

The first member 21 and the second member 22 are coupled together as the part of the first member 21 protruding below the bottom surface of the casing of the main body device 10 and the attachment part 222 are fixed together by a plurality of sets of bolts 23 and nuts 24.

Thus, in the support member 20, the pedestal part 221 serves as the pedestal for placing the POS terminal device 1 on a table, and the attachment part 222 and the first member 21 maintain the main body device 10 in the attitude shown in FIG. 1. The top surface of the table is horizontal in many cases. Therefore, the state of the support member 20 in such a first use pattern is an example of a first state. However, the POS terminal device 1 may be placed on the top surface of a table that is not horizontal.

Figure 3:
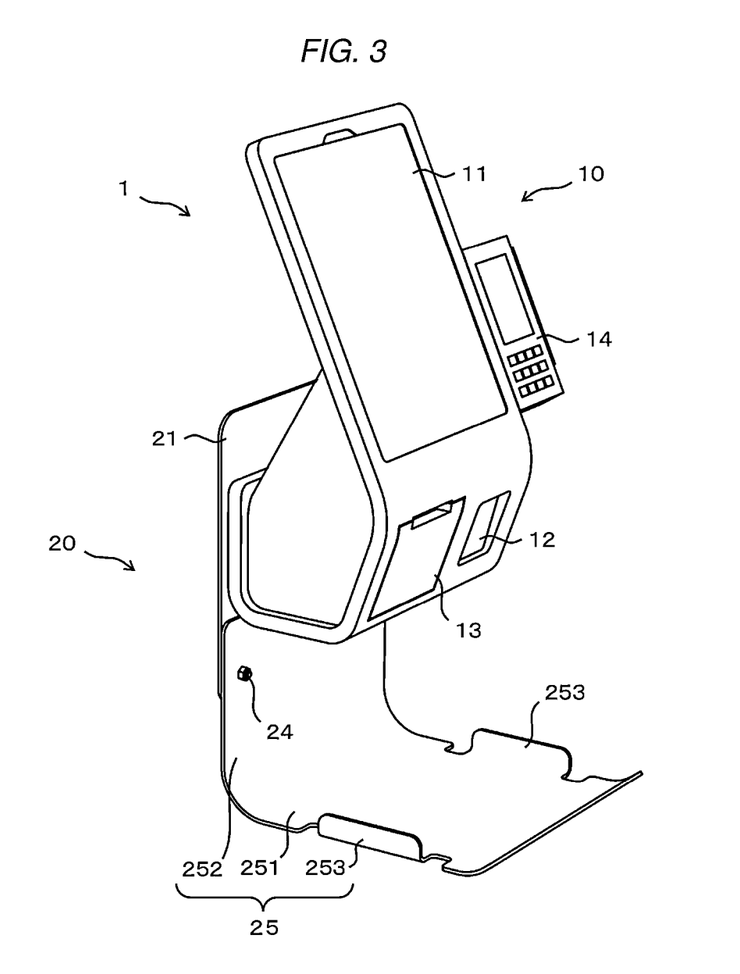
FIG. 3 is a perspective view showing a configuration in a second use pattern of the POS terminal device.

FIG. 3 is a perspective view showing a configuration in a second use pattern of the POS terminal device 1. Of the elements shown in FIG. 3, the elements also shown in FIGS. 1 and 2 are denoted by the same reference signs and are not described further in detail.

In the second use pattern of the POS terminal device 1, the support member 20 is formed of the first member 21 and a third member 25. That is, the second use pattern differs from the first use pattern in having the third member 25 instead of the second member 22.

In the third member 25, one rectangular thin plate is bent in such a way that the two ends in the longitudinal direction of the plate face different directions from each other, thus forming a table part 251 and an attachment part 252 on the opposite sides of the bent part. For the third member 25, a material such as a metal having such a rigidity that the third member 25 is not easily deformed from this state is used. The angle formed by the directions in which the two ends in the longitudinal direction of the third member 25 face may preferably be approximately 90 degrees but may be any angle. At the two side edges of the table part 251, a part of the thin plate is bent to form a pair of hooks 253, 253.

The first member 21 and the third member 25 are coupled together as the part of the first member 21 protruding below the bottom surface of the casing of the main body device 10 and the attachment part 252 are fixed together by a plurality of sets of bolts 23 and nuts 24.

Figure 4:
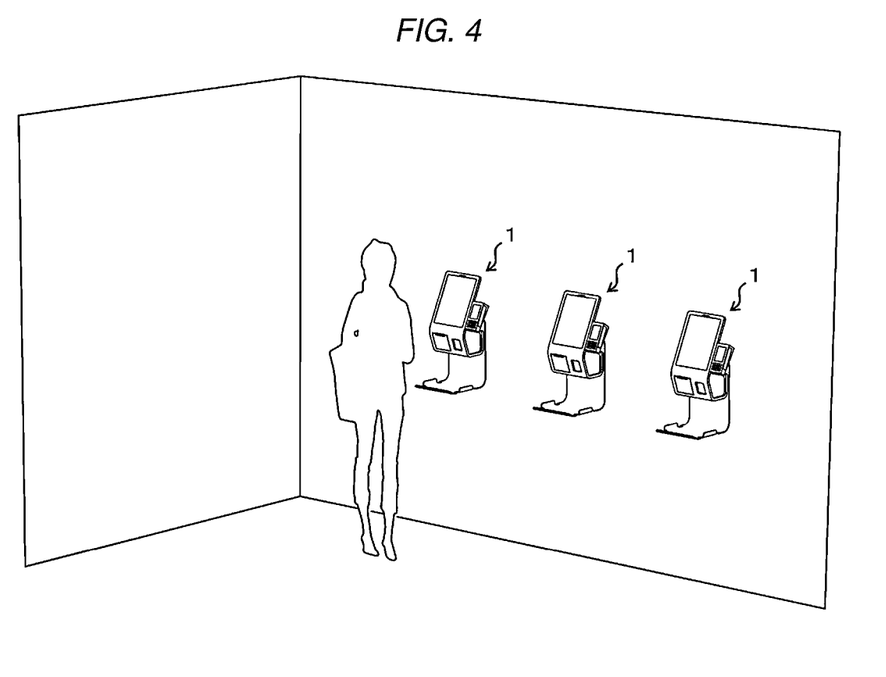
FIG. 4 shows an example of the state where three POS terminal devices are installed at a wall surface of a store.

FIG. 4 shows an example of the state where three POS terminal devices 1 are installed at a wall surface of a store.

Figure 5:
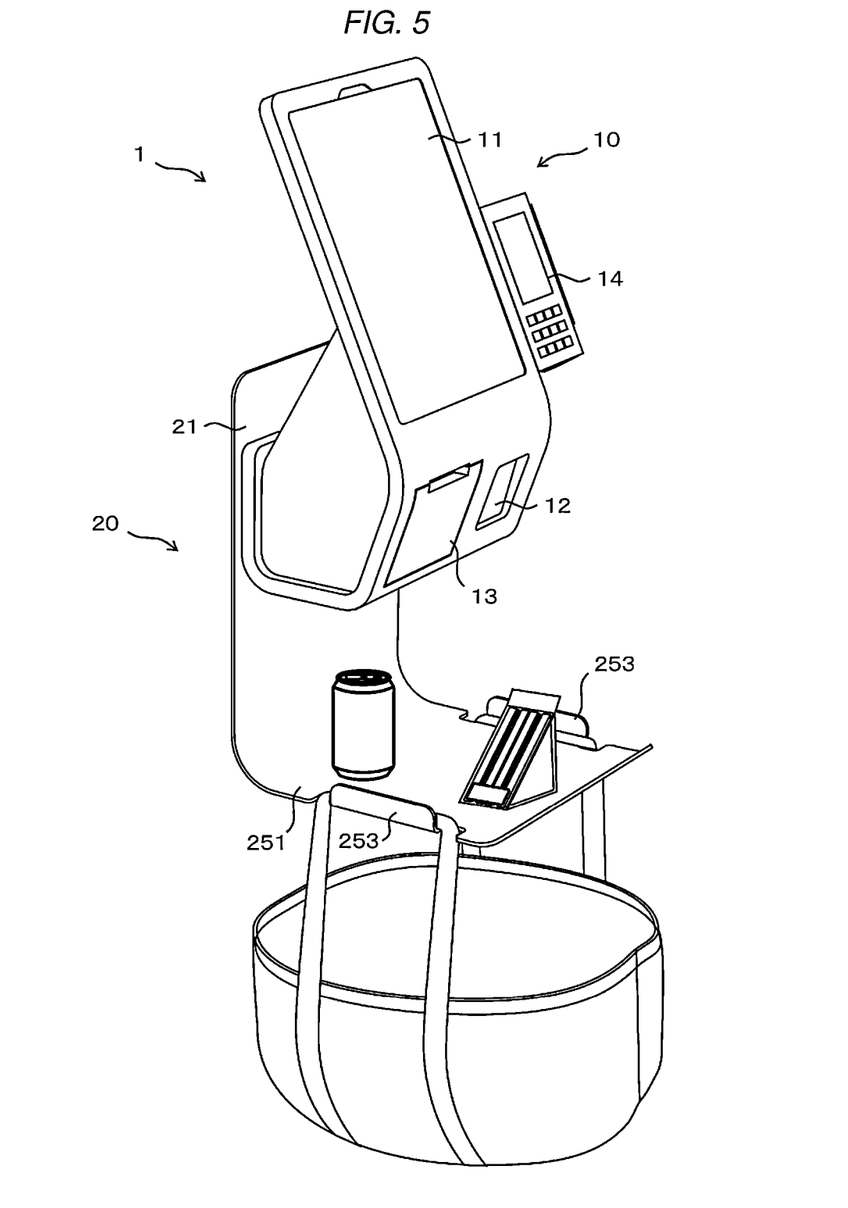
FIG. 5 shows an example of the status of use of the POS terminal device installed at the wall surface.

FIG. 5 shows an example of the status of use of the POS terminal device 1 installed at the wall surface.

In FIGS. 4 and 5, the illustration of the coupling part between the first member 21 and the third member 25 is omitted.

In the second use pattern, the POS terminal device 1 is suitable for the use in the state of being installed at a wall surface, which is a vertical surface, as shown in FIG. 4. In this use pattern, the table part 251 is a protruding part protruding from the vertical surface, and the top surface of the table part is a substantially horizontal surface, which is suitable for temporarily placing a merchandise item as shown in FIG. 5. The hooks 253, 253 are suitable for hanging a carrier bag such as a shopping bag or a checkout bag as shown in FIG. 5. In general, a wall surface is a vertical surface. However, as a matter of course, the POS terminal device 1 can also be installed at a wall surface that is not a vertical surface. The state of the support member 20 in such a second use pattern is an example of a second state.

Thus, the use pattern of the POS terminal device 1 can be changed, such as being placed on a table or hanging on a wall, in accordance with various store environments. If the POS terminal device 1 is placed on a table, the function of the pedestal part 221 prevents change in the attitude of the main body device 10 even if a force to operate the touch panel 11 and the settlement unit 14 is applied. If the POS terminal device 1 is hanging on a wall, the space occupied by the POS terminal device 1 can be reduced and therefore effective use of the store space can be achieved. Also, as described above, the third member 25 can be used as a table and to hang a bag.

Second Embodiment

Figure 6:
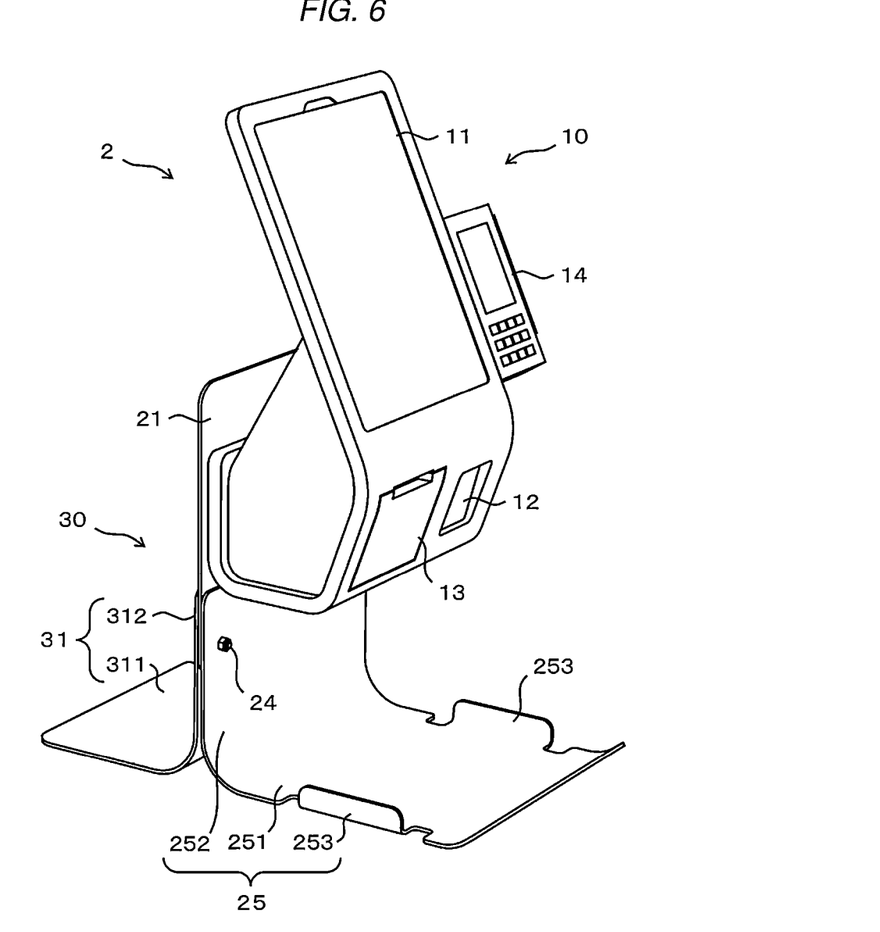
FIG. 6 is a perspective view showing a configuration in the first use pattern of a POS terminal device according to a second embodiment.

FIG. 6 is a perspective view showing a configuration in the first use pattern of a POS terminal device 2 according to a second embodiment. Of the elements shown in FIG. 6, the elements also shown in FIGS. 1, 2, and 3 are denoted by the same reference signs and are not described further in detail.

The POS terminal device 2 includes the main body device 10 and a support member 30.

The configuration of the support member 30 in the second use pattern is similar to the configuration in the first embodiment.

In the first use pattern, the support member 30 is formed of the first member 21, the third member 25, and a fourth member 31. That is, in the first use pattern, the support member 30 additionally has the fourth member 31, as compared with the second use pattern.

In the fourth member 31, one rectangular thin plate is bent in such a way that the two ends in the longitudinal direction of the plate face different directions from each other, thus forming a pedestal part 311 and a pedestal part 311 on the opposite sides of the bent part. For the fourth member 31, a material such as a metal having such a rigidity that the fourth member 31 is not easily deformed from this state is used. The angle formed by the pedestal part 311 and the distal end of the attachment part 312 may preferably be approximately 90 degrees but may be any angle.

The first member 21, the third member 25, and the fourth member 31 are coupled together as the part of the first member 21 protruding below the bottom surface of the casing of the main body device 10, and the attachment part 252 and the attachment part 312, are fixed together by a plurality of sets of bolts 23 and nuts 24. The third member 25 and the fourth member 31 are in such a state that the lower surface of the table part 251 and the lower surface of the pedestal part 311 are located on the same plane and that the table part 251 and the pedestal part 311 extend in the opposite directions from each other on the opposite sides of the first member 21.

In the support member 30, the table part 251 and the pedestal part 311 serve as a pedestal for placing the POS terminal device 2 on a table, and the attachment parts 252, 312 and the first member 21 maintain the main body device 10 in the attitude shown in FIG. 6.

Thus, the use pattern of the POS terminal device 2 can be changed, such as being placed on a table or hanging on a wall, in accordance with various store environments. If the POS terminal device 2 is placed on a table, the function of the table part 251 and the pedestal part 311 prevents change in the attitude of the main body device 10 even if a force to operate the touch panel 11 and the settlement unit 14 is applied. If the POS terminal device 2 is hanging on a wall, the space occupied by the POS terminal device 2 can be reduced and therefore effective use of the store space can be achieved. Also, as described above, the third member 25 can be used as a table and to hang a bag.

Moreover, the POS terminal device 2 can be switched between the first use pattern and the second use pattern simply by attaching and removing the fourth member 31.

Third Embodiment

Figure 7:
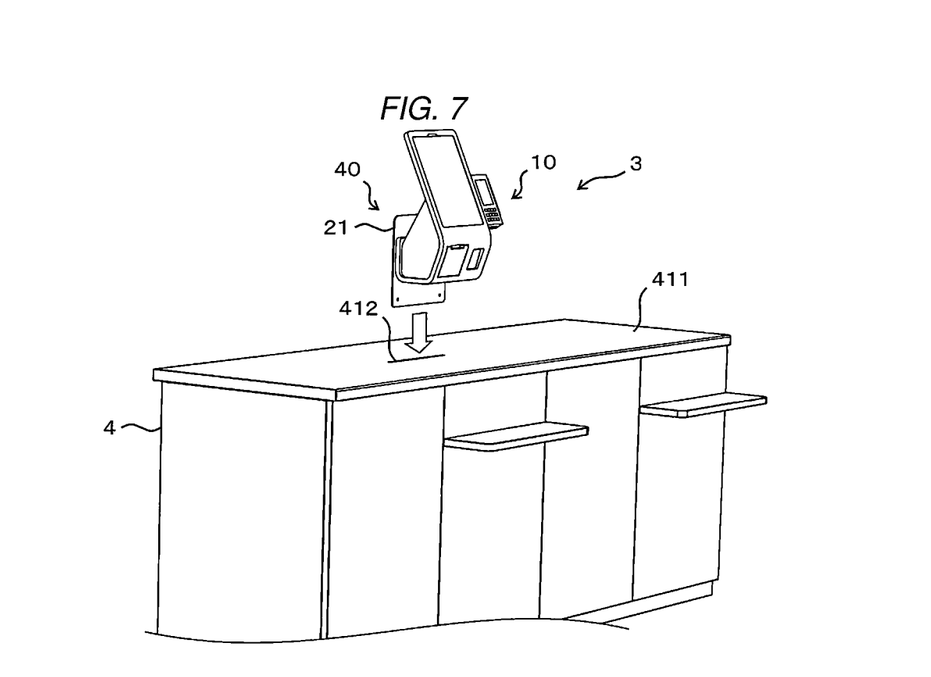
FIG. 7 is a perspective view showing a configuration in the first use pattern of a POS terminal device according to a third embodiment.

FIG. 7 is a perspective view showing a configuration in the first use pattern of a POS terminal device 3 according to a third embodiment.

Figure 8:
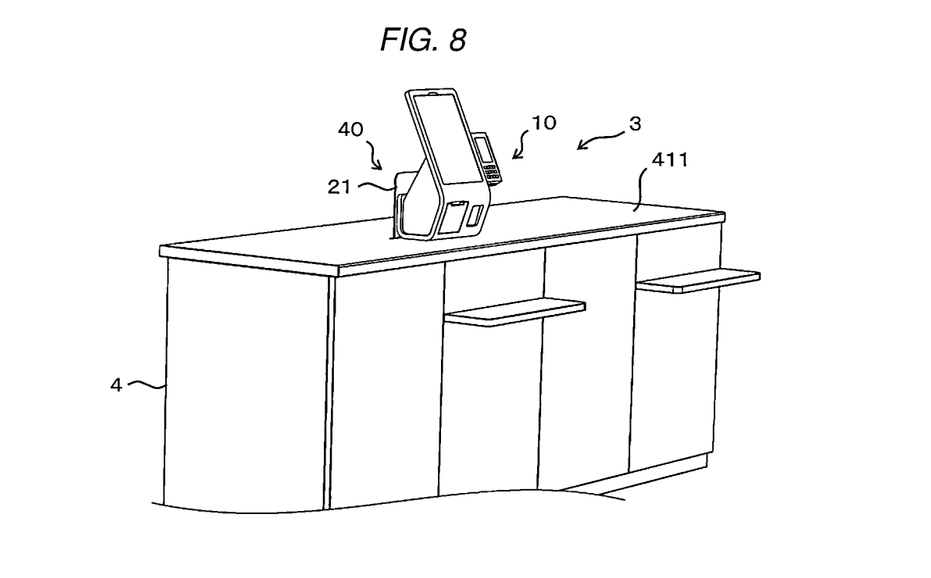
FIG. 8 is a perspective view showing the status of use in the first use pattern.

FIG. 8 is a perspective view showing the status of use in the first use pattern of the POS terminal device 3 according to the third embodiment.

Of the elements shown in FIGS. 7 and 8, the elements also shown in FIGS. 1 and 2 are denoted by the same reference signs and are not described further in detail.

The POS terminal device 3 includes the main body device 10 and a support member 40.

The configuration of the support member 40 in the second use pattern is similar to the configuration in the first embodiment.

In the first use pattern, the support member 40 is formed of the first member 21. That is, in the first use pattern, the third member 25 is omitted from the support member 40, as compared with the second use pattern.

In the first use pattern, the part of the first member 21 protruding below the bottom surface of the casing of the main body device 10 is inserted in a slit 412 formed in a top board 411 of an installation table 4, as shown in FIG. 7. Thus, a state where the bottom surface of the main body device 10 is in contact with the upper surface of the top board 411 as shown in FIG. 8 is created.

Thus, the use pattern of the POS terminal device 3 can be changed, such as being placed on a table or hanging on a wall, in accordance with various store environments. If the POS terminal device 3 is placed on a table, the function of the first member 21 prevents change in the attitude of the main body device 10 even if a force to operate the touch panel 11 and the settlement unit 14 is applied. If the POS terminal device 3 is hanging on a wall, the space occupied by the POS terminal device 3 can be reduced and therefore effective use of the store space can be achieved. Also, as described above, the third member 25 can be used as a table and to hang a bag.

Moreover, the POS terminal device 3 can be switched between the first use pattern and the second use pattern simply by attaching and removing the third member 25.

These embodiments can be implemented with various modifications as described below.

First Modification Example

In the first, second, and third embodiments, the POS terminal device 1, 2, 3 in the second use pattern may be installed at a wall surface via a slide rail.

Figure 9:
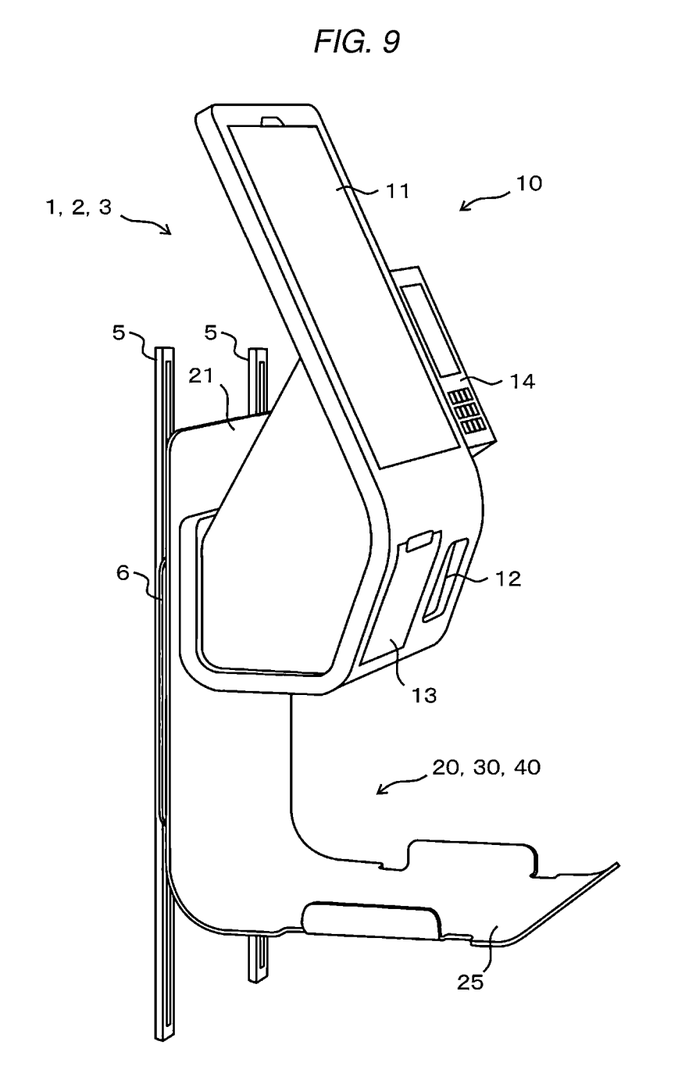
FIG. 9 is a perspective view showing the status of use in the second use pattern in a first modification example.

FIG. 9 is a perspective view showing the status of use in the second use pattern in a first modification example.

Figure 10:
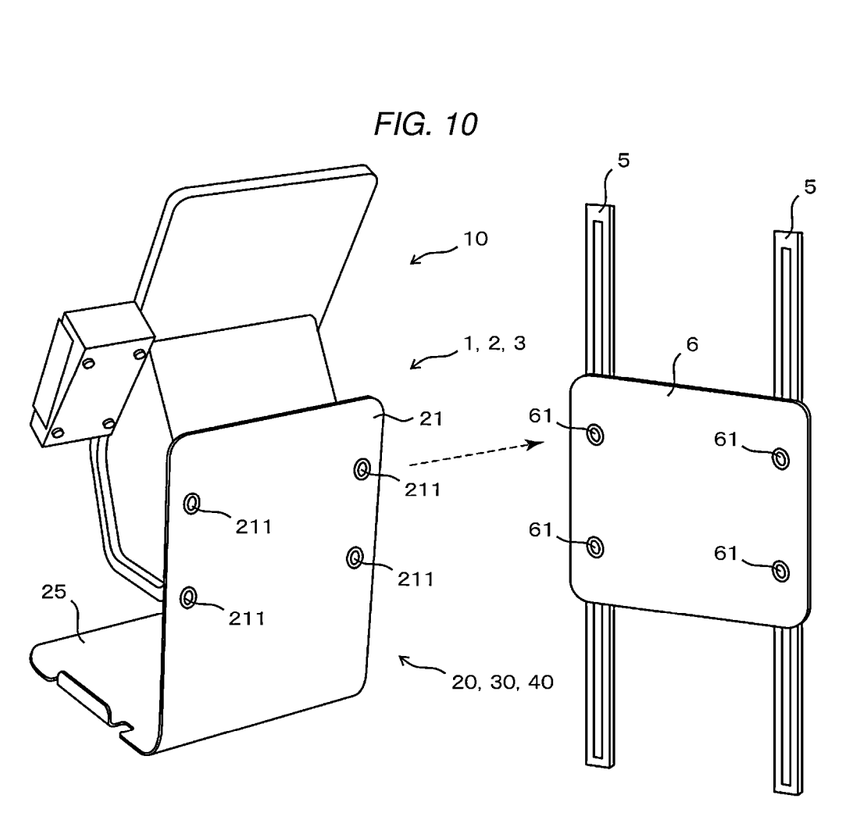
FIG. 10 is an exploded perspective view showing the status of installation of the POS terminal device on slide rails.

FIG. 10 is an exploded perspective view showing the status of installation of the POS terminal device 1, 2, 3 on slide rails.

Of the elements shown in FIGS. 9 and 10, the elements also shown in FIGS. 1 and 2 are denoted by the same reference signs and are not described further in detail. In FIG. 9, the illustration of the coupling part between the first member 21 and the third member 25 is omitted.

A pair of slide rails 5 are attached to a wall surface in the state of being slidable in the vertical direction and arranged side by side in the horizontal direction. A slide plate 6 is attached to each of the pair of slide rails 5 in the state of extending over the two slide rails 5. The first member 21 is fixed to the slide plate 6 by a bolt or the like through a hole 211 formed in the first member 21 and a hole 61 formed in the slide plate 6.

As the slide rails 5, a free-stop type is preferable. However, a known fixing mechanism for fixing the position of the slide plate 6 in relation to the slide rails 5 at some fixed positions or any position may be separately provided.

Second Modification Example

In the first, second, and third embodiments, the POS terminal device 1, 2, 3 in the second use pattern may be installed at a wall surface via a height adjustment plate.

Figure 11:
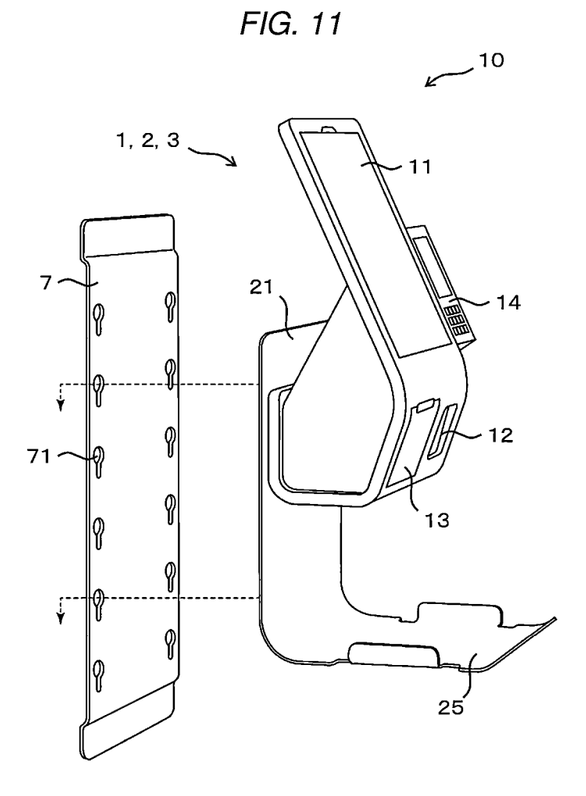
FIG. 11 is an exploded perspective view showing the status of installation of the POS terminal device on a height adjustment plate.

FIG. 11 is an exploded perspective view showing the status of installation of the POS terminal device 1, 2, 3 to a height adjustment plate 7.

Of the elements shown in FIG. 11, the elements also shown in FIGS. 1 and 2 are denoted by the same reference signs and are not described further in detail. In FIG. 11, the illustration of the coupling part between the first member 21 and the third member 25 is omitted.

The height adjustment plate 7 is in the shape of an elongated plate and is fixed to a wall surface at the two ends in the longitudinal direction. The height adjustment plate 7 in the state of being fixed to the wall surface is spaced apart from the wall surface over most of the area thereof except for the two ends in the longitudinal direction. A plurality of holes 71 are formed in the area spaced apart from the wall surface, of the height adjustment plate 7. In the example shown in FIG. 11, six pairs of holes 71 are formed along the vertical direction, each pair of holes 71 being arranged side by side in the horizontal direction. However, the number and position of the holes 71 may be changed according to need.

Figure 12:
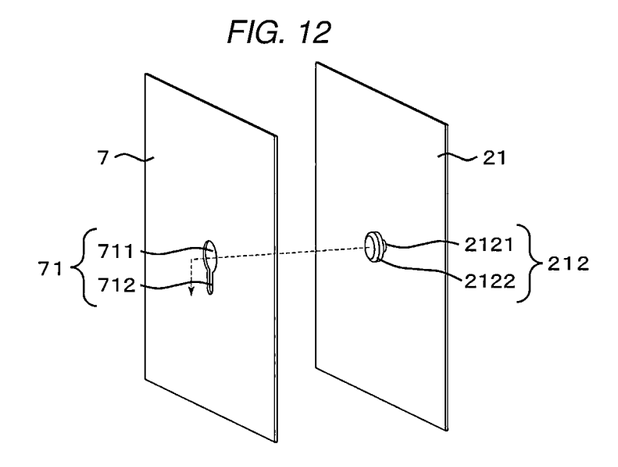
FIG. 12 shows an example of a structure for installing a first member on the height adjustment plate.

FIG. 12 shows an example of a structure for attaching the first member 21 to the height adjustment plate 7. Of the elements shown in FIG. 12, the elements also shown in FIGS. 1, 2, and 11 are denoted by the same reference signs and are not described further in detail.

The hole 71 has a circular part 711 and a slit part 712 connected to the circular part 711 from below the circular part 711 and extending in the vertical direction. The width in the horizontal direction of the slit part 712 is smaller than the dimeter of the circular part 711.

In the first member 21 according to the second modification example, a hook member 212 shown in FIG. 12 is formed instead of each of the holes 211 shown in FIG. 10 according to the first modification example.

The hook member 212 has a shaft 2121 protruding from the slide plate 6 and a disk-like protrusion 2122 formed at the distal end of the shaft 2121. The width in the radial direction of the shaft 2121 is smaller than the width in the radial direction of the protrusion 2122 and is smaller than the width in the horizontal direction of the slit part 712. The amount of protrusion of the shaft 2121 from the slide plate 6 is larger than the thickness of the area spaced apart from the wall surface, of the height adjustment plate 7. The thickness of the protrusion 2122 is smaller than the distance between the area spaced apart from the wall surface, of the height adjustment plate 7, and the wall surface.

The width in the radial direction of the protrusion 2122 is smaller than the diameter of the circular part 711. That is, the protrusion 2122 can pass through the circular part 711. If the first member 21 is moved downward relatively to the height adjustment plate 7 in the state where the protrusion 2122 is completely passed through the circular part 711, the shaft 2121 enters the slit part 712. Since the protrusion 2122 cannot pass through the slit part 712, the first member 21 can be prevented from being detached from the height adjustment plate 7. Thus, the first member 21 is fixed to the height adjustment plate 7 and the POS terminal device 1, 2, 3, too, is fixed to the height adjustment plate 7.

The positions on the first member 21, of the four hook members 212 provided on the first member 21, are decided in such a way as to coincide with the positions of four of the holes 71 formed in the height adjustment plate 7.

The protrusions 2122 of the four hook members 212 provided on the first member 21 are simultaneously inserted in the circular parts 711 of the four holes 71, and the first member 21 is shifted downward after each protrusion 2122 is passed through each circular part 711. Thus, the first member 21 and the POS terminal device 1, 2, 3 with the first member 21 attached thereto are fixed to the height adjustment plate 7. The height at which the POS terminal device 1, 2, 3 is held by the height adjustment plate 7 can be changed by changing the holes 71 in which the protrusions 2122 of the four hook members 212 are inserted.

The hook structure formed of the hole 71 and the hook member 212 shown in FIG. 12 can also be employed to fix the first member 21 to the slide plate 6 in the first modification example. That is, in this case, for example, the hook member 212 is formed instead of the hole 211 shown in FIG. 10 and the hole 71 shown in FIG. 12 is formed instead of the hole 61 shown in FIG. 10.

Third Modification Example

Figure 13:
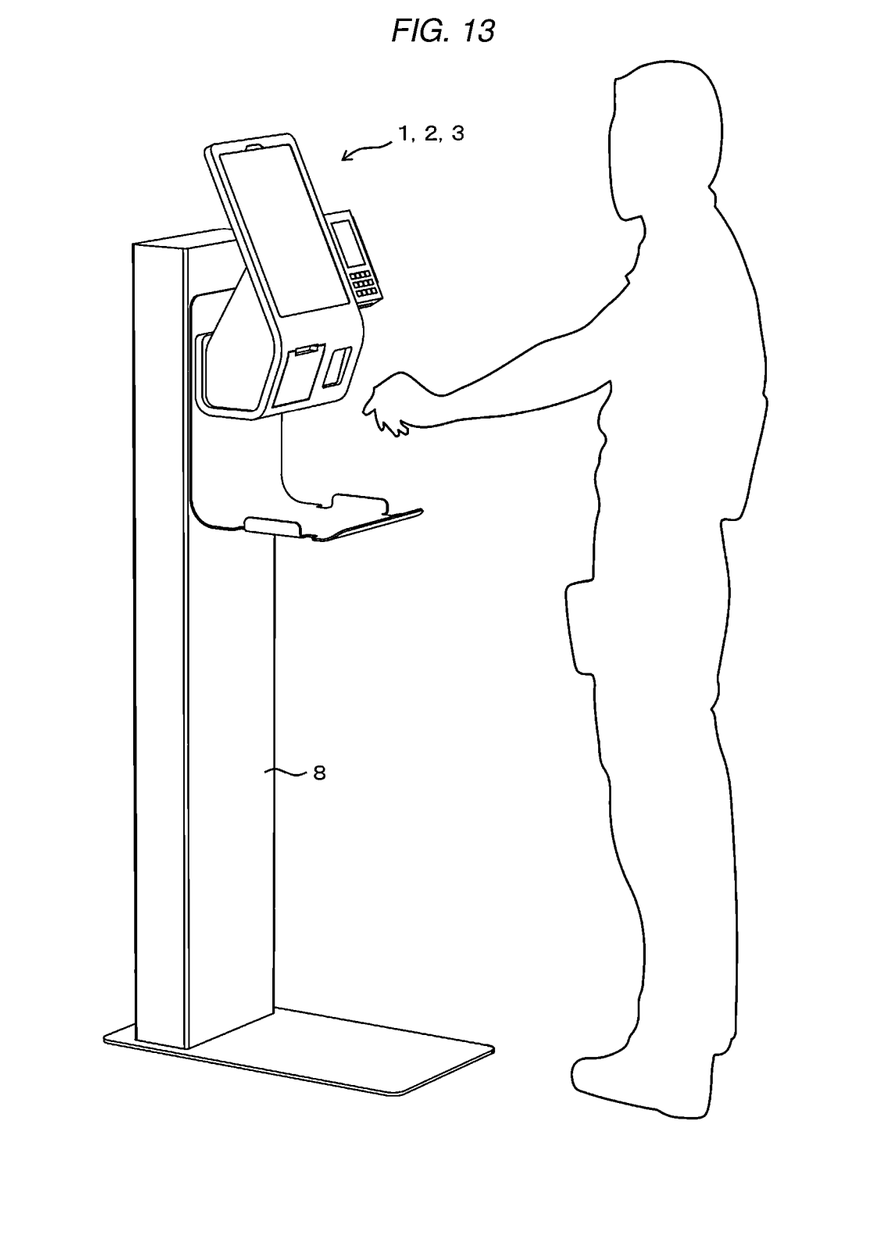
FIG. 13 shows a modification example of the status of use in the second use pattern.

FIG. 13 shows a modification example of the status of use in the second use pattern of the POS terminal device 1, 2, 3.

Of the elements shown in FIG. 13, the elements also shown in FIGS. 1 and 2 are denoted by the same reference signs and are not described further in detail. In FIG. 13, the illustration of the coupling part between the first member 21 and the third member 25 is omitted.

In the status of use shown in FIG. 13, the POS terminal device 1, 2, 3 is installed at an installation surface, which is a vertical surface, of a freestanding stand 8.

The installation surface of the freestanding stand 8 may be not a vertical surface.

Other Modification Examples

In the first embodiment, the change between the first use pattern and the second use pattern can be made by suitably attaching a member in the shape of the first member 21 and the second member 22 unified together or a member in the shape of the first member 21 and the third member 25 unified together.

In the second and third embodiments, the first member 21 and the third member 25 may be replaced by a member in the shape of these members unified together.

In the embodiments and the modification examples, the devices provided in the main body device 10 can be suitably changed.

In the embodiments and the modification examples, the shape of each member included in the support member 20, 30, 40 is an example and the shape of small parts thereof can be suitably changed.

The present technique can be implemented as a merchandise sales device that performs one of registration processing, payment processing, and settlement processing.

In the POS terminal device 1, 2, 3 in each embodiment, the support member 20, 30, 40 may be attached to the main body device 10 by the user or the like after the main body device 10 and the support member 20, 30, 40 are separately provided.

In the first embodiment, each of the first member 21, the second member 22, and the third member 25 may be separately provided, or a set of the first member 21 and the second member 22 or a set of the first member 21 and the third member 25 may be provided. Alternatively, a set of the main body device 10 and the first member 21 may be provided and the second member 22 and the third member 25 may be provided separately.

In the second embodiment, each of the first member 21, the third member 25, and the fourth member 31 may be separately provided, or a set of the first member 21 and the third member 25 may be provided. Alternatively, a set of the main body device 10, the first member 21, and the third member 25 may be provided and the fourth member 31 may be provided separately.

While some embodiments of the present disclosure have been described, these embodiments are presented simply as examples and are not intended to limit the scope of the present disclosure. These novel embodiments can be implemented in various other forms and can include various omissions, replacements, and changes without departing from the spirit and scope of the present disclosure. These embodiments and modifications thereof are included in the spirit and scope of the present disclosure and also included in the scope of the claims and equivalents thereof.

What is claimed is:

1. A merchandise sales device, comprising:
a main body device configured to perform information processing for merchandise sales while accepting an operation from an operator; and
a support member configured to selectively form a first state where the main body device is placed at a horizontal surface while a predetermined attitude of the main body device is maintained, and a second state where the main body device is fixed to a vertical surface, wherein
the support member includes a first member and a second member configured to be selectively attachable to the main body device,
the first member forms the first state when attached to the main body device,
the second member forms the second state when attached to the main body device, and
the second member comprises a protruding part protruding from a vertical surface of a fixing target, and a top surface of the protruding part functions as a table to place a merchandise item.

2. The merchandise sales device according to claim 1, wherein
a width of the main body device in a first direction in which the main body device is pushed during the operation by the operator is smaller than a width thereof in a second direction orthogonal to the first direction, and
the first member prevents the main body device from tilting in the first direction and thereby maintains the predetermined attitude.

3. The merchandise sales device according to claim 1, wherein
the protruding part comprises a hook for hooking a carrier bag.

4. The merchandise sales device according to claim 1, wherein
the information processing comprises payment of a price of a merchandise item registered to be sold in response to the operation by the operator.

5. The merchandise sales device according to claim 1, wherein
the information processing comprises calculation processing for calculation of a price of at least one merchandise item and settlement processing for settlement of the price.

6. The merchandise sales device according to claim 1, wherein the support member further comprises:
a supplemental member comprising a rectangular thin plate bent so that two ends in a longitudinal direction of a thin plate face different directions from each other, thereby forming a first pedestal part and a second pedestal part on opposite sides thereof.

7. A support member forming a merchandise sales device along with a main body device that performs information processing for merchandise sales while accepting an operation from an operator, the support member configured to selectively form:
a first state where the main body device is placed at a horizontal surface while a predetermined attitude of the main body device is maintained;
and a second state where the main body device is fixed to a vertical surface,
wherein the support member includes a first member and a second member configured to be selectively attachable to the main body device, the first member forms the first state when attached to the main body device, and the second member forms the second state when attached to the main body device, and
wherein the support member further comprises:
a supplemental member comprising a rectangular thin plate bent so that two ends in a longitudinal direction of a thin plate face different directions from each other, thereby forming a first pedestal part and a second pedestal part on opposite sides thereof.

8. The support member according to claim 7, wherein a width of the main body device in a first direction in which the main body device is pushed during the operation by the operator is smaller than a width thereof in a second direction orthogonal to the first direction, and the first member prevents the main body device from tilting in the first direction and thereby maintains the predetermined attitude.

9. The support member according to claim 7, wherein the second member comprises a protruding part protruding from a vertical surface of a fixing target, and a top surface of the protruding part functions as a table to place a merchandise item.

10. The support member according to claim 9, wherein the protruding part comprises a hook for hooking a carrier bag.

11. A point of sale terminal, comprising:
a main body device configured to perform information processing for merchandise sales while accepting an operation from an operator; and
a support member configured to selectively form a first state where the main body device is placed at a horizontal surface while a predetermined attitude of the main body device is maintained, and a second state where the main body device is fixed to a vertical surface, wherein
the support member includes a first member and a second member configured to be selectively attachable to the main body device,
the first member forms the first state when attached to the main body devic,
the second member forms the second state when attached to the main body device, and
the second member comprises a protruding part protruding from a vertical surface of a fixing target, and a top surface of the protruding part functions as a table to place a merchandise item.

12. The point of sale terminal according to claim 11, wherein
a width of the main body device in a first direction in which the main body device is pushed during the operation by the operator is smaller than a width thereof in a second direction orthogonal to the first direction, and
the first member prevents the main body device from tilting in the first direction and thereby maintains the predetermined attitude.

13. The point of sale terminal according to claim 11, wherein
the protruding part comprises a hook for hooking a carrier bag.

14. The point of sale terminal according to claim 11, wherein
the information processing comprises payment of a price of a merchandise item registered to be sold in response to the operation by the operator.

15. The point of sale terminal according to claim 11, wherein
the information processing comprises calculation processing for calculation of a price of at least one merchandise item and settlement processing for settlement of the price.

16. The point of sale terminal according to claim 11, wherein the support member further comprises:
a supplemental member comprising a rectangular thin plate bent so that two ends in a longitudinal direction of a thin plate face different directions from each other, thereby forming a first pedestal part and a second pedestal part on opposite sides thereof.

* * * * *